(12) United States Patent
Shimizu et al.

(10) Patent No.: US 7,110,076 B2
(45) Date of Patent: Sep. 19, 2006

(54) IN-PLANE LIQUID CRYSTAL DEVICE WITH ELECTRIC FIELD SHIELDING LAYER

(75) Inventors: Hidehisa Shimizu, Shiga (JP); Mitsuru Ikezaki, Shiga (JP); Kaoru Kusafuka, Shiga (JP)

(73) Assignee: Chi Mei Optoelectronics Corp., (TW)

( * ) Notice: Subject to any disclaimer, the term of this patent is extended or adjusted under 35 U.S.C. 154(b) by 171 days.

(21) Appl. No.: 10/704,123

(22) Filed: Nov. 10, 2003

(65) Prior Publication Data

US 2004/0150768 A1    Aug. 5, 2004

(30) Foreign Application Priority Data

Nov. 12, 2002  (JP)  ............... 2002-328816

(51) Int. Cl.
   *G02F 1/1343* (2006.01)
(52) U.S. Cl. ............... 349/141; 349/54; 349/106
(58) Field of Classification Search ............... None
   See application file for complete search history.

(56) References Cited

U.S. PATENT DOCUMENTS

| | | | |
|---|---|---|---|
| 6,486,933 B1 * | 11/2002 | Cha et al. ............... | 349/139 |
| 6,661,492 B1 * | 12/2003 | Kim ............... | 349/141 |
| 6,744,482 B1 * | 6/2004 | Matsumoto et al. ......... | 349/141 |
| 6,847,421 B1 * | 1/2005 | Cheng ............... | 349/106 |
| 6,917,394 B1 * | 7/2005 | Song et al. ............... | 349/43 |
| 6,924,863 B1 * | 8/2005 | Nishida et al. ............... | 349/141 |

FOREIGN PATENT DOCUMENTS

| | | |
|---|---|---|
| JP | 9-101538 A | 4/1997 |
| JP | 9-311334 A | 12/1997 |
| JP | 2000-147234 A | 5/2000 |
| JP | 2002-014373 A | 1/2002 |

* cited by examiner

*Primary Examiner*—Andrew Schechter
*Assistant Examiner*—Richard H Kim
(74) *Attorney, Agent, or Firm*—Foley & Lardner LLP

(57) ABSTRACT

A liquid crystal display device includes a planarizing layer; a common electrode on the planarizing layer; a pixel electrode on the planarizing layer; a liquid crystal layer; a data line; and a color filter layer. An electric field is generated between the pixel electrode and the common electrode. The liquid crystal layer covers the common electrode and the pixel electrode. The color filter layer includes a first filter and a second filter in contact with the first filter. The first filter transmits a light, of a first wavelength, that passes through the pixel electrode. The second filter transmits a light, of a second wavelength, that passes through the other pixel electrode next to the pixel electrode.

15 Claims, 13 Drawing Sheets

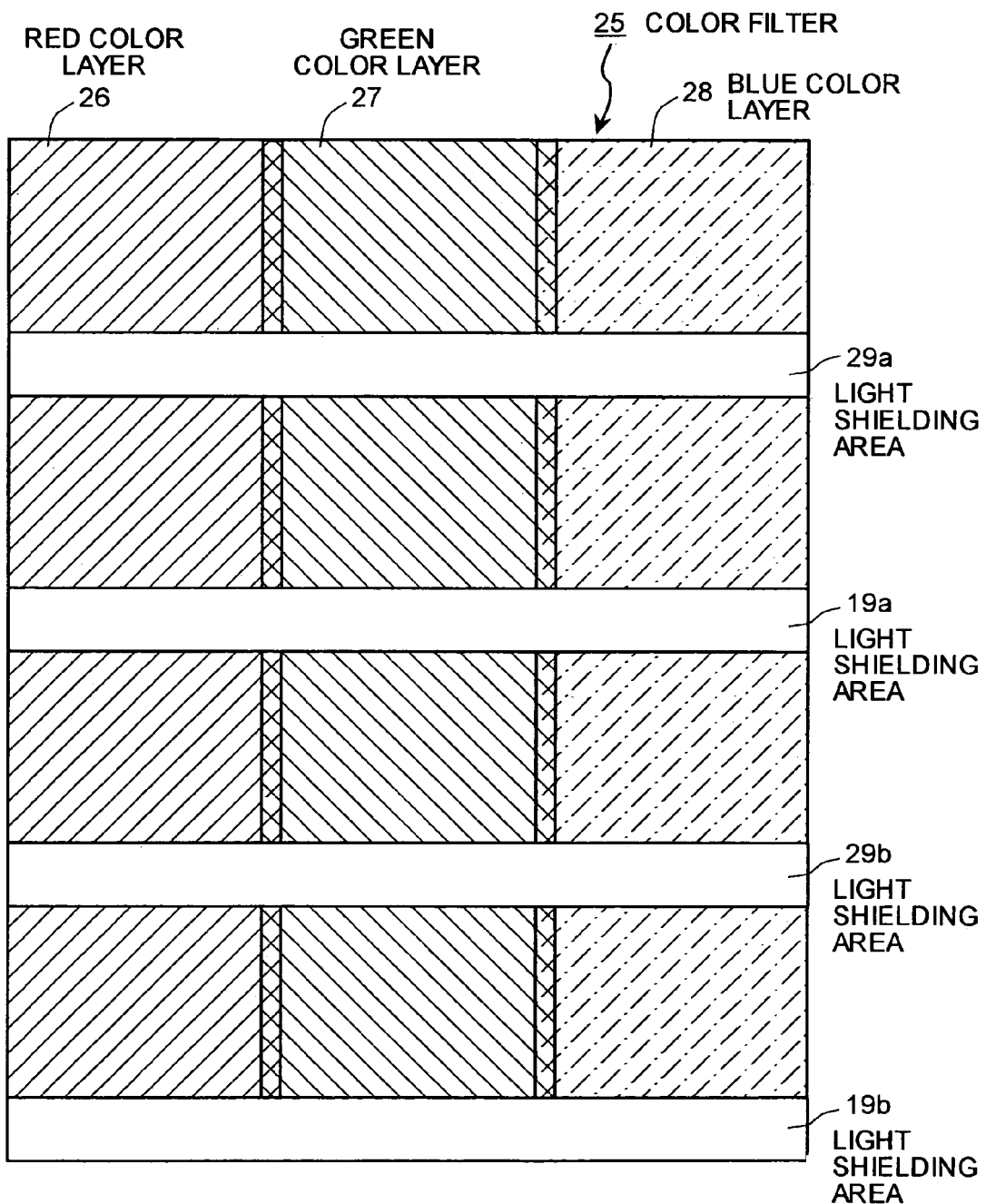

IN-PLANE LIQUID CRYSTAL DEVICE WITH ELECTRIC FIELD SHIELDING LAYER

BACKGROUND OF THE INVENTION

1) Field of the Invention

The present invention relates to an in-plane switching liquid crystal display, more particularly to a liquid crystal display device suppress the shift of display colors due to aging and a liquid crystal display apparatus including the liquid crystal display device.

2) Description of the Related Art

Conventionally, an in-plane switching (hereinafter, "IPS") image display apparatus is proposed, and practical application of this apparatus is progressed. The IPS image display apparatus has a configuration of controlling the orientation of liquid crystal molecules and displaying a predetermined image by applying an electric field to the liquid crystal molecules in a direction parallel to the substrate where a liquid crystal layer is disposed. As compared with a conventional image display apparatus that an electric field is applied in a direction perpendicular to the substrate, the IPS image display apparatus has superior voltage holding characteristic and a broader view angle due to the electric field direction.

FIG. 12 is a schematic view of a part of the conventional IPS image display apparatus. As shown in FIG. 12, the conventional IPS image display apparatus includes a transparent array substrate 101, a transparent counter substrate 102, and a liquid crystal layer 103 that is disposed between these substrates.

On the array substrate 101, there are disposed a common electrode 104, a pixel electrode 105, a data line 106, and a scan line (not shown). The liquid crystal molecules having the liquid crystal layer 103 has orientation. By controlling the electric field applied to between the pixel electrode 105 and the common electrode 104, an image can be displayed by utilizing the electro-optic effect of the liquid crystal.

Further, a color filter 107 is disposed on the counter substrate 102 to make it possible to display a color image. The color filter 107 has a function of transmitting only lights of wavelength corresponding to R (red), G (green), and B (blue) out of an incandescent light that is transmitted through the liquid crystal layer 103. FIG. 12 displays a green color layer 110 that makes the light of the wavelength corresponding to green pass through as an example.

A back light unit not shown that functions as a light source is provided beneath the array substrate 101, and irradiates a plane beam of an incandescent light to the array substrate 101. The liquid crystal layer 103 has a function of generating lights and shades on the screen by controlling a light transmittance of the irradiated incandescent light corresponding to the potential of the pixel electrode 105, thereby to display the image. Specifically, a predetermined potential is given to the pixel electrode 105 to generate an electric field between the pixel electrode 105 and the common electrode 104. The orientation of the liquid crystal molecules within the liquid crystal layer 103 is controlled in the electric field. The light transmittance is controlled following the change in the orientation.

The function of a light shielding layer 111 provided within the color filter 107 is explained. The electric field applied to the liquid crystal molecules within the liquid crystal layer 103 is generated not only between the pixel electrode 105 and the common electrode 104 but also between the common electrode 104 and the data line 106. The data line 106 has a predetermined potential irrespective of the potential of the pixel electrode 105. Therefore, the electric field attributable to the data line 106 is generated irrespective to the potential variation of the pixel electrode 105. Consequently, in the case of the IPS image display apparatus in the normally black mode, for example, the orientation of the liquid crystal molecule near the data line 106 changes due to the electric field attributable to the data line 106, even when a potential is not given to the pixel electrode 105 display black. As a result, the light that passes through the data line 106 and the common electrode 104 is discharged to the outside, and a black color having a color shading is displayed, which degrades the displayed image.

In order to shield the light that passes through the data line 106 and the common electrode 104, the light shielding layer 111 is disposed, thereby to suppress the degrading of the image quality. Particularly, the light shielding layer 111 is disposed in the area corresponding to the area where the common electrode 104 and the data line 106 are disposed within the color filter 107. With this arrangement, the leakage of the light that passes through between the data line 106 and the common electrode 104 to the outside is suppressed, thereby maintaining a high image quality (refer to Japanese Patent Application Laid-open Publication No. 9-101538, for example).

However, based on the provision of the light shielding layer 111, the conventional IPS image display apparatus has the following problems. First, the aperture ratio falls due to the provision of the light shielding layer 111.

While the light shielding layer 111 is provided to prevent the light not contributing to the image display from being leaked out, the light shielding layer 111 also shields a part of the light that passes through between the pixel electrode 105 and the common electrode 104 that is necessary for the image display. The incandescent light supplied from the back light unit contains a part of the component that proceeds to an inclined direction. Therefore, in order to shield this light as well, the light shielding layer 111 is disposed over a wide area. When a positioning error at the manufacturing time is considered, the area of the light shielding layer 111 further expands. Consequently, a part of the light that is necessary for the image display is also shielded near the end of the light shielding layer 111, which lowers the aperture ratio, resulting in a reduction in the brightness of the display image.

Degradation of the image quality due to the disposition of the light shielding layer 111 is also pointed out. Specifically, it is known that due to the accumulation of a charge near the boundary between the light shielding layer 111 and the green color layer 110, a third electric field is applied to the liquid crystal layer 103, which degrades the image quality. This phenomenon is considered attributable to a reduction in the specific resistance of the green color layer 110 due to the aging and a subsequent reduction in the light transmittance due to the accumulation of the charge, in the configuration shown in FIG. 12. Actually, as a result of an acceleration test of the color filter 107 carried out in a high temperature and high humidity condition, the inventors of the present application confirm that the specific resistance of $10^{15}$ Ω·cm at the beginning decreases to $10^{10}$ Ω·cm.

Further, as a result of an acceleration test carried out for the IPS image display apparatus built in with the color filter, it is confirmed that the light transmittance in the green color layer 110 is lowered extremely more than in other color filter due to the charge accumulation, and that the color tone of the total image shifts. FIG. 13 is a graph illustrating a change in a y value that indicates the intensity of the green color component of an image displayed in the IPS image display apparatus according to the conventional technique as a result of the acceleration test. In the present acceleration test, the intensity is measured for two different IPS image display apparatuses, and lines 13 and 14 are obtained. As is clear from the lines 13 and 14, the y value is lowered by about 0.02 as a result of the acceleration carried out for 100 hours. In general, when the y value changes by about 0.01, a color shift of the display image can be visually confirmed. A user recognizes the color shift in the IPS image display apparatus having the conventional configuration, which is not preferable.

SUMMARY OF THE INVENTION

It is an object of the present invention to at least solve the problems in the conventional technology.

A liquid crystal display device according to one aspect of the present invention includes a planarizing layer; a common electrode on the planarizing layer; a first pixel electrode on the planarizing layer, wherein an electric field is generated between the first pixel electrode and the common electrode; a second pixel electrode on the planarizing layer, wherein an electric field is generated between the second pixel electrode and the common electrode; a liquid crystal layer that covers the common electrode, the first pixel electrode, and the second pixel electrode; a first data line; a first switching element that applies to the first pixel electrode an electric potential according to display signals supplied to the first data line; a second data line; a second switching element that applies to the second pixel electrode an electric potential according to display signals supplied to the second data line; a scan line that is supplied with scan signals to control the first switching element and the second switching element; and a color filter layer that includes a first filter and a second filter in contact with the first filter, wherein the first filter transmits a light, of a first wavelength, that passes through the first pixel electrode, and the second filter transmits a light, of a second wavelength, that passes through the second pixel electrode.

A liquid crystal display according to another aspect of the present invention includes the liquid crystal display device according to the present invention; a voltage application unit that is electrically connected to the first data line, the second data line, and the scan line, and that applies predetermined voltages to the first pixel electrode and the second pixel electrode; a control unit that controls the voltage application unit based on image information; and a frame member that houses the liquid crystal display device, the voltage application unit, and the control unit, and that includes a display window which defines a display screen.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 9 is a top plan view of a color filter that constitutes the liquid crystal display device;

DETAILED DESCRIPTION

Exemplary embodiments of a liquid crystal display device and a liquid crystal display apparatus according to the present invention are explained below with reference to the drawings. In the following embodiments, when there are a plurality of parts of the same configuration, one of these parts is explained as a representative when necessary. When the same part is explained using a plurality of drawings, a reference symbol shown in one drawing will also be used in the rest of the drawings. Identification characters a, b, c, etc. are assigned to reference symbols when necessary. When there are a plurality of the same parts like "pixel electrodes 10*a*, and 10*b*", these parts are collectively called a "pixel electrode 10" when necessary.

Figure 1:
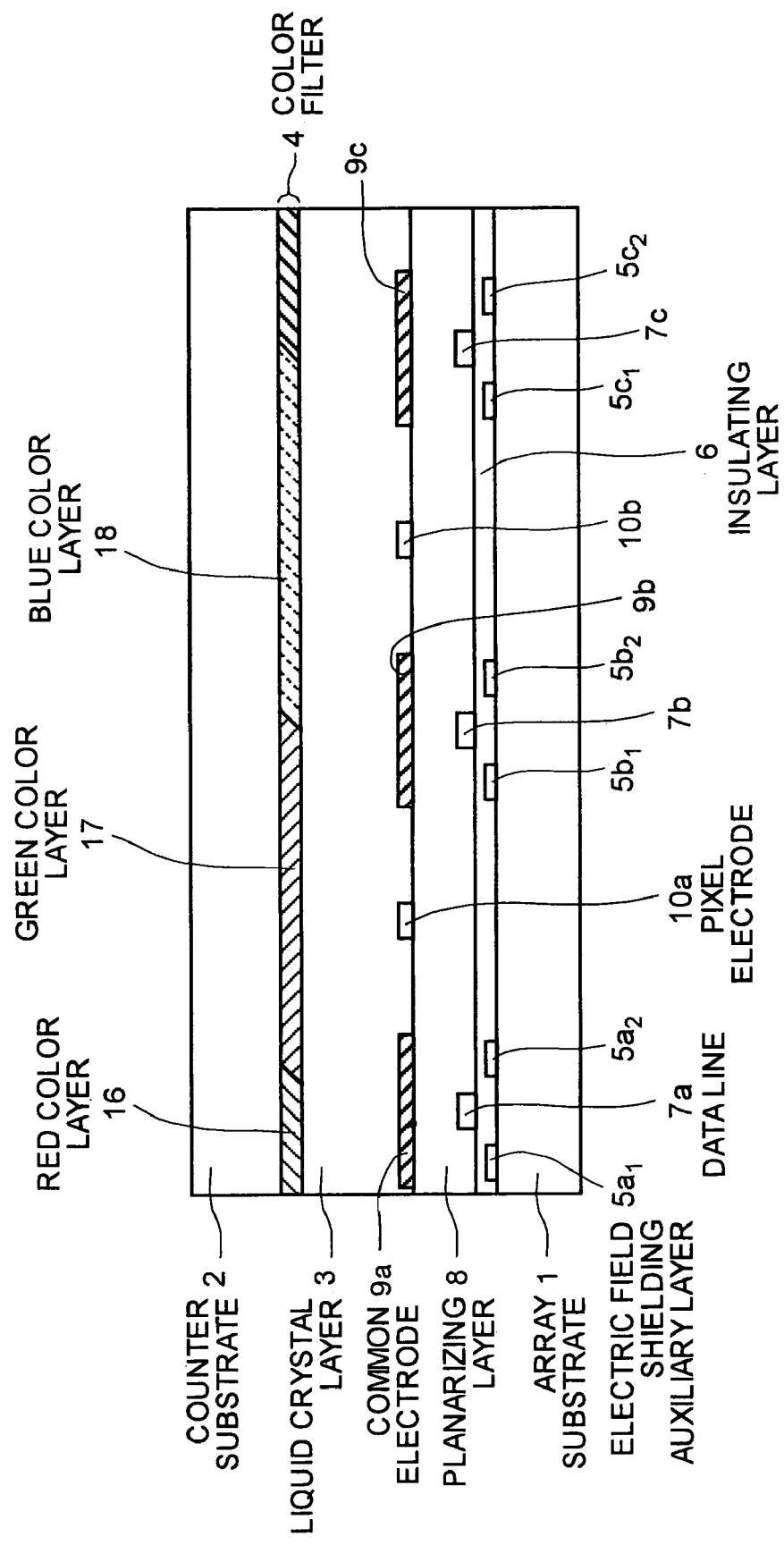
FIG. 1 is a cross-sectional view of a liquid crystal display device according to a first embodiment of the present invention.
Figure 2:
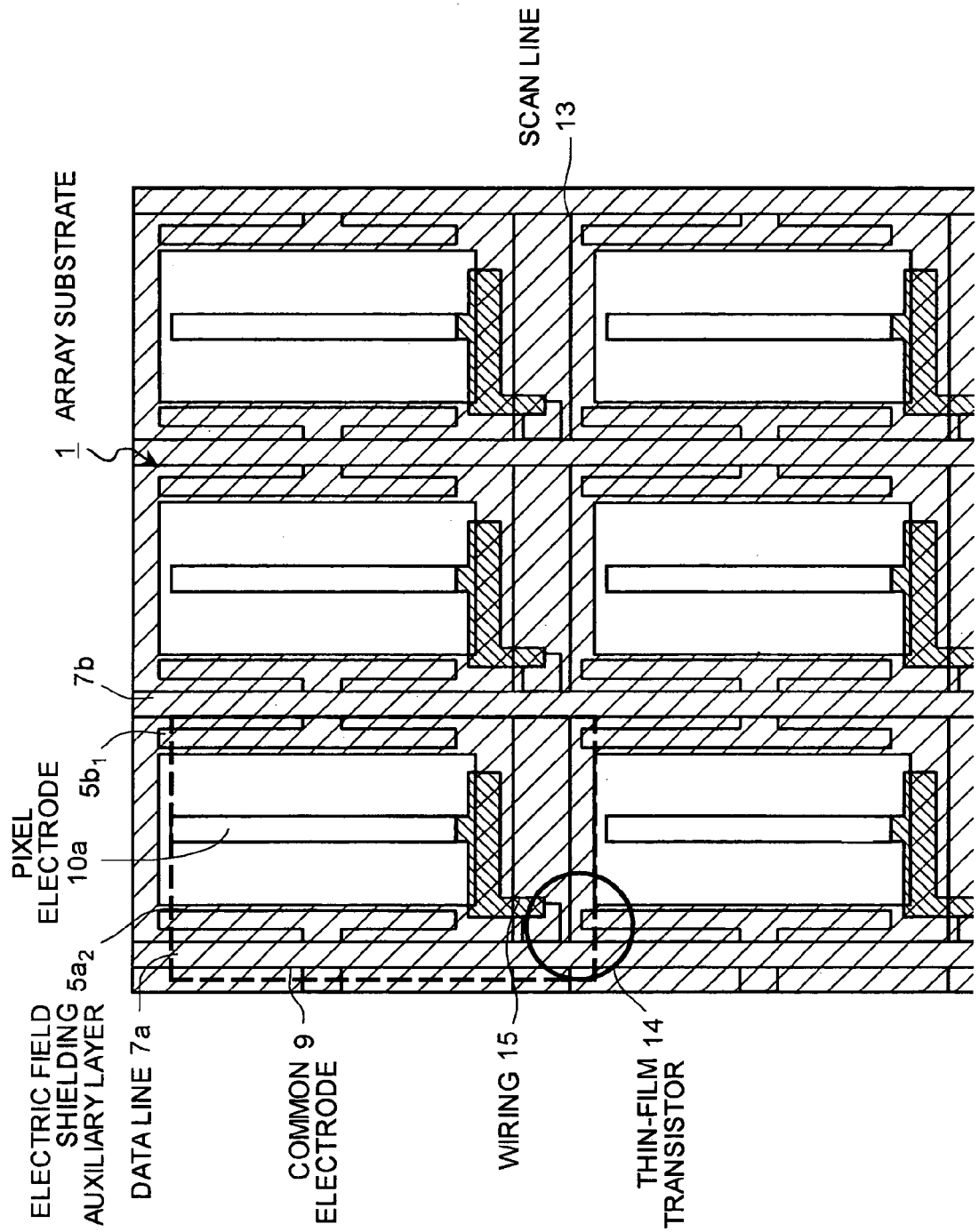
FIG. 2 is a top plan view of a circuit disposed on an array substrate that constitutes the liquid crystal display device.
Figure 3:
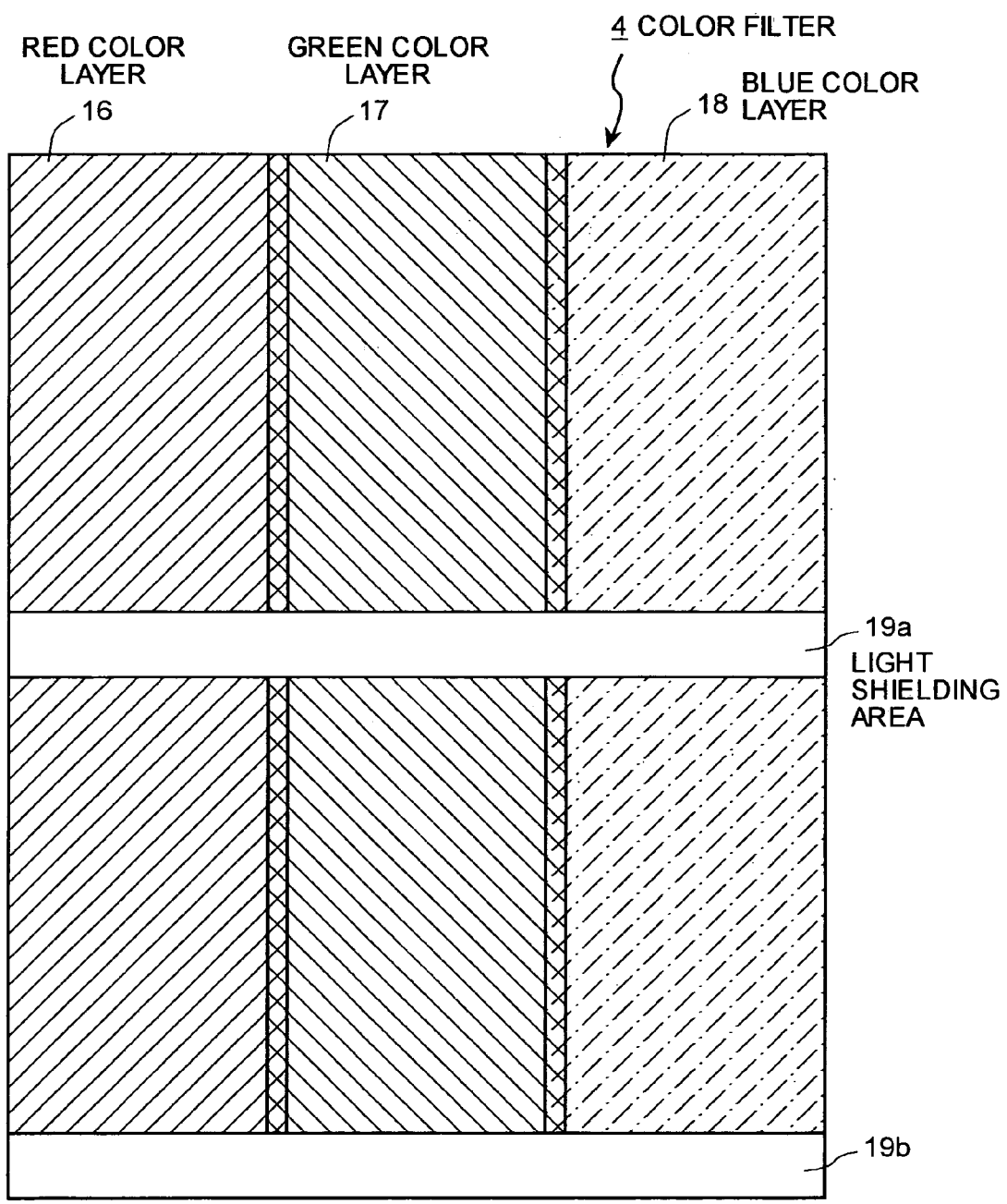
FIG. 3 is a top plan view of a color filter that constitutes the liquid crystal display device.

A first embodiment of the present invention will be explained below. A liquid crystal display device according to the first embodiment has a wiring having an electric field shielding function near a data line. A light shielding area is not disposed between light transmission windows that constitute a color filter. The light transmission windows are directly in contact with each other. FIG. 1 is a schematic view of a cross-sectional configuration of the liquid crystal display device according to the first embodiment. FIG. 2 is a top plan view of a color filter that constitutes the liquid crystal display device. FIG. 3 is a top plan view of an array substrate that constitutes the liquid crystal display device. The liquid crystal display device has a configuration having display pixels arrayed in a matrix of M×N (where M and N represent optional positive numbers respectively). In FIG. 1 to FIG. 3, a part of the display pixels is displayed in order to facilitate the understanding. The configuration of the liquid crystal display device according to the first embodiment is explained with reference to FIG. 1 to FIG. 3.

As shown in FIG. 1, the liquid crystal display device according to the first embodiment has an array substrate 1, and a counter substrate 2 that is disposed opposite to the array substrate 1. A liquid crystal layer 3 formed with a liquid crystal material is sealed in between the array substrate 1 and the counter substrate 2. A color filter 4 is disposed on the internal surface of the counter substrate 2. The light components of wavelengths corresponding to R (red), G (green), and B (blue) are transmitted through the color filter 4 out of an incandescent light that is transmitted through the liquid crystal layer 3, thereby to achieve a color image display. Field shielding auxiliary layers $5a_1$, $5a_2$, $5b_1$, $5b_2$, $5c_1$, and $5c_2$ are disposed in areas corresponding to ends of display pixels. An insulating layer 6 is disposed to cover the array substrate 1 and the electric field shielding auxiliary layer $5a_1$ to $5c_2$. Data lines 7a to 7c are disposed in areas corresponding to the ends of the display pixels on the insulating layer 6. A planarizing layer 8 is disposed on the data lines 7a to 7c and the insulating layer 6. Common electrodes 9a to 9c are disposed in areas on the data lines 7a to 7c on the planarizing layer 8 respectively. A pixel electrode 10a is disposed in the area between the common electrodes 9a and 9b, and a pixel electrode 10b is disposed in the area between the common electrodes 9b and 9c.

The array substrate 1 and the counter substrate 2 are formed with transparent and colorless nonalkali glass respectively. The nonalkali glass refers to glass of a structure having the content of alkaline substance such as $Na_2O$ and $K_2O$ suppressed to not higher than 0.8 weight percent. The array substrate 1 and the counter substrate 2 have an excellent shape of a flat surface to avoid giving influence to the course of a light that is incident from beneath, and have a low coefficient of thermal expansion. The array substrate 1 and the counter substrate 2 may have a structure formed with a transparent plastic substrate and quartz glass or the like according to the usage. In order to prescribe an interval between the array substrate 1 and the counter substrate 2, a spacer not shown is disposed between the array substrate 1 and the counter substrate 2.

The liquid crystal layer 3 is formed to have a liquid crystal molecule having orientation as a main component. A fluorinated pneumatic liquid crystal molecule can be used as an example of the liquid crystal that constitutes the liquid crystal layer 3. In addition to the fluorinated pneumatic liquid crystal molecule, other liquid crystal molecule can also be used that constitutes a pneumatic liquid crystal and a cholesteric liquid crystal. In other words, in general, any liquid crystal molecule that is used for an IPS configuration can be used for the liquid crystal layer 3 according to the first embodiment. There is no particular limitation to the liquid crystal molecule. In order to prescribe the orientation of the liquid crystal molecule included in the liquid crystal molecule layer 3, both or either one of the array substrate 1 and the counter substrate 2 generally has a configuration of an orientation film provided on the surface in contact with the liquid crystal layer 3. The orientation film has the following configuration. An organic film such as polyimide and polyamine acid is coated on the surface of both or either one of the array substrate 1 and the counter substrate 2. The coated surface is sintered. The sintered surface is frictionized with cotton or rayon cloth in a predetermined direction, thereby to provide the surface with anisotropy. The anisotropy of the surface configuration controls the orientation of the liquid crystal molecule. An inorganic film can also be formed as the orientation film by deposition or sputtering. Light or an ion beam is irradiated onto the inorganic film to provide the surface configuration with anisotropy. Any other configuration that can prescribe the orientation of the liquid crystal molecule can be used, and the configuration of the orientation film does not have to be limited to the above.

The insulating layer 6 is formed with a transparent and insulating material such as $SiN_x$. The planarizing layer 8 is formed with an organic material having polymer or $SiN_x$ deposited in a large thickness. As the planarizing layer 8 has a thick laminated configuration, a parasitic capacitance generated between the data line 7 and the common electrode 9 decreases. While the insulating layer 6 and the planarizing layer 8 are single layers respectively in FIG. 1, these layers may be in a multiple configuration using a plurality of materials.

The common electrode 9 and the pixel electrode 10 are formed with indium tin oxide (ITO), indium zinc oxide (IZO) or the like having conductivity and excellent light transmission characteristics respectively. The common electrode 9 is maintained with substantially a constant potential. In the first embodiment, the common electrode 9 is electrically connected with the electric field shielding auxiliary layer 5.

A plane configuration of the circuit disposed on the array substrate 1 is explained next. As shown in FIG. 2, a wiring corresponding to a plurality of display pixels is provided on the array substrate 1. The wiring corresponding to the display pixels shown by areas encircled by broken lines in FIG. 2 is explained. As is clear from FIG. 2, it is needless to mention that other display pixels also have similar wiring configurations.

In the center of the display pixel, the pixel electrode 10a extending in a perpendicular direction is disposed. The common electrode 9 is disposed with a predetermined distance from the pixel electrode 10a. There is an opening between the pixel electrode 10a and the common electrode 9. A scan line 13 extending in a lateral direction is disposed near the pixel electrode 10a. A thin-film transistor 14 is disposed on the scan line 13. One source/drain electrode of the thin-film transistor 14 is connected to the pixel electrode 10a via a wiring 15. The other source/drain electrode is connected to the data line 7a. A gate electrode of the thin-film transistor 14 is connected to the scan line 13. The ON and OFF of the thin-film transistor 14 is controlled based on a display signal supplied from the data line 7a and a scan signal supplied from the scan line 13. A predetermined charge is accumulated in the pixel electrode 10a. In the first embodiment, an n-channel thin-film transistor is explained as the thin-film transistor 14. It is needless to mention that the present invention can also be applied to a p-channel thin-film transistor.

A configuration of the color filter is explained next. As shown in FIG. 3, the color filter 4 has a red color layer 16, a green color layer 17, and a blue color layer 18 that transmit lights of wavelengths corresponding to red, green, and blue respectively, arrayed in a stripe. The red color layer 16, the green color layer 17, and the blue color layer 18 are directly adjacent to each other. Near the boundary between the color layers, the respective color layers are superimposed. A light shielding area is not disposed between the color layers. A light shielding area 19 is disposed in the area immediately above the scan line 13 shown in FIG. 2.

The red color layer 16, the green color layer 17, and the blue color layer 18 function as light transmission windows that transmit light components of wavelengths corresponding to red, green, and blue respectively. These color layers are formed with phthalocyanine compounds, for example, and have high transmittance of the lights of wavelengths corresponding to red, green, and blue respectively. Therefore, the incandescent light incident from the rear surface of the array substrate 1 passes through the liquid crystal layer 3. Only the light components of predetermined wavelengths pass through the color layers respectively, thereby to display a color image.

The light shielding area 19 prevents a natural light from entering the thin-film transistor 14 from the outside. This is because it is necessary to prevent the occurrence of a light leak current due to the entering of a light into the channel that constitutes the thin-film transistor 14. Therefore, the light shielding area 19 has only the purpose of shielding a light from the outside. It is not provided to improve the contrast of the display image like the conventional practice.

Figure 4:
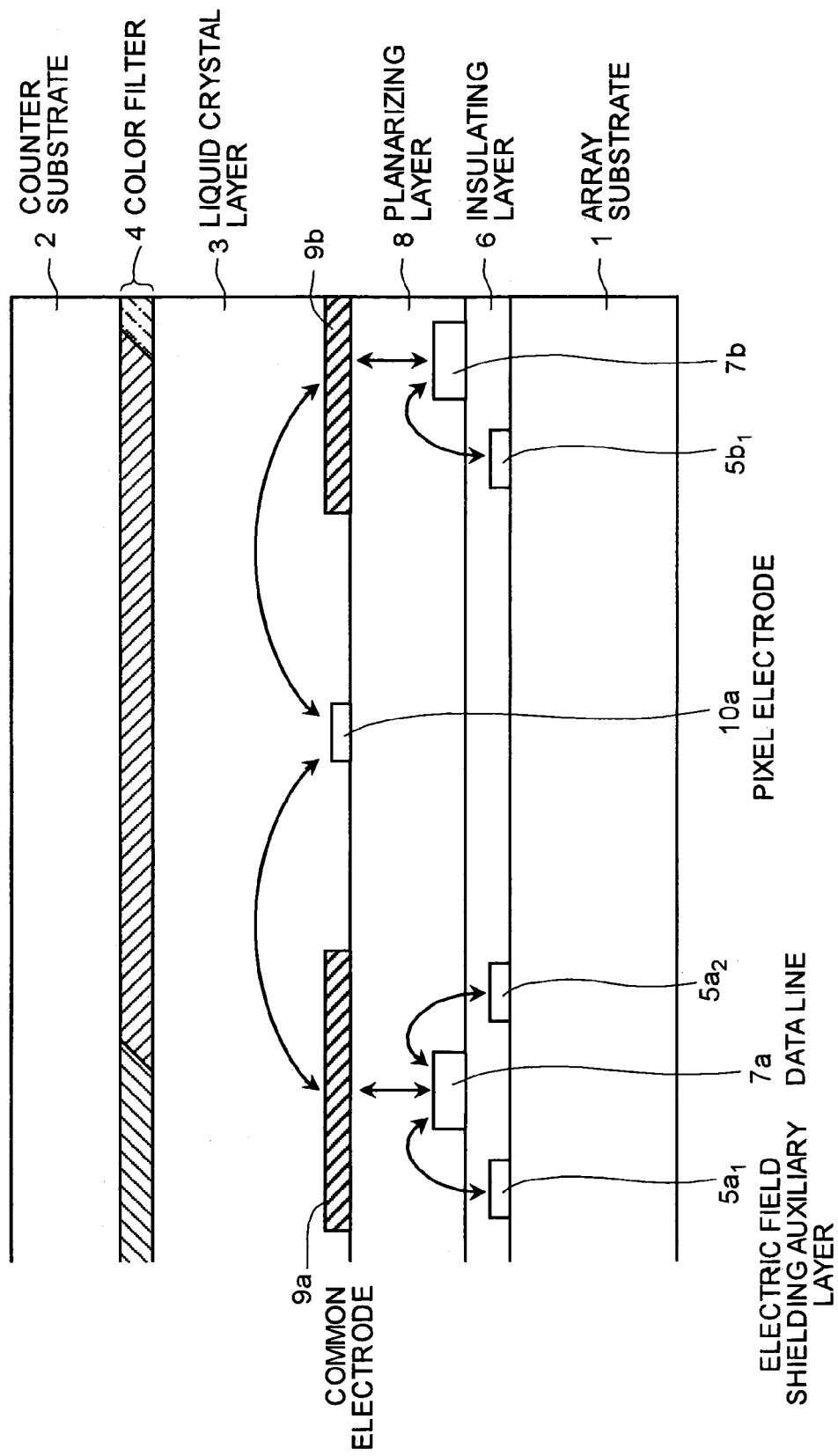
FIG. 4 is a schematic view of an electric field that is generated when the liquid crystal display device is operated.

The operation of the liquid crystal display device according to the first embodiment is explained next. FIG. 4 is a schematic view of an electric field that is generated when the liquid crystal display device according to the first embodiment is operated. The operation is explained with reference to FIG. 4.

As described above, the liquid crystal display device according to the first embodiment has the IPS configuration having the common electrode 9 and the pixel electrode 10 disposed on the same substrate. Therefore, when a predetermined charge is supplied to the pixel electrode 10, an electric field is generated between the pixel electrode 10 and the common electrode 9 in a direction parallel with the array substrate 1. Based on this electric field, the orientation of the liquid crystal molecule in the liquid crystal layer 3 changes.

On the other hand, as a predetermined potential needs to be supplied to other pixels that extend in the longitudinal direction as well, the potential of the data line 7 always changes. Therefore, a potential difference occurs between this potential and the potentials of other wires. When this electric field extends to the liquid crystal layer 3, this gives influence to the liquid crystal molecule, which degrades the quality of the display image.

The liquid crystal display device according to the first embodiment has the common electrode 9 disposed immediately above the data line 7 as explained above. With this arrangement, degradation of the image quality in the electric field attributable to the data line 7 is suppressed. Specifically, the common electrode 9 is maintained at a predetermined potential, and is disposed between the data line 7 and the liquid crystal layer 3. Therefore, the common electrode 9 has the function of shielding the electric field attributable to the data line 7. The common electrode 9 prevents the electric field attributable to the data line 7 from affecting the orientation of the liquid crystal molecule that constitutes the liquid crystal layer 3.

Therefore, the liquid crystal display device according to the first embodiment does not generate a disturbance in the orientation of the liquid crystal molecule that is present on the upper area of the data line 7. Accordingly, a light that passes through the area of the disturbed orientation of the liquid crystal molecule does not leak out unlike in the conventional practice. Consequently, the liquid crystal display device according to the first embodiment can display a high-quality image.

The electric field shielding auxiliary layer 5 also has the function of preventing the electric field attributable to the data line 7 from affecting the liquid crystal layer 3. Based on the provision of the electric field shielding auxiliary layer 5 near the data line 7, the electric field that cannot be shielded by the common electrode 9 is shielded. This suppresses the electric field from further affecting the liquid crystal layer 3. It is preferable that the electric field shielding auxiliary layer 5 is disposed immediately below the common electrode 9. This is for the following reason. A conductive material that constitutes the electric field shielding auxiliary layer 5 in general has light shielding characteristics. Therefore, when the electric field shielding auxiliary layer is disposed at a position corresponding to the opening, its aperture ratio falls.

When only the common electrode 9 shields the electric field attributable to the data line 7, the opening becomes narrow, as the common electrode 9 needs to have a large width to completely shield the electric field. Accordingly, the brightness of the display image is lowered. On the other hand, when the electric field shielding auxiliary layer 5 is disposed, a part of the electric field attributable to the data line 7 is shielded. Therefore, even when the common electrode 9 has a small width, the electric field attributable to the data line 7 does not affect the liquid crystal layer 3. Consequently, the width of the common electrode 9 can be made small, thereby to increase the area of the open area. As a result, the brightness of the display image can be improved.

As explained above, the liquid crystal display device according to the first embodiment has the common electrode 9 that functions as an electric field shielding layer and the electric field shielding auxiliary layer 5. With this arrangement, it is possible to suppress the electric field attributable to the data line 7 from affecting the liquid crystal layer 3. Accordingly, the disturbance of the orientation of the liquid crystal molecule that constitutes the liquid crystal layer 3 due to the electric field attributable to the data line 7 can be prevented. Therefore, there is no need to dispose a light shielding area between the adjacent color layers in the color filter 4 that is disposed on the counter substrate 2. Consequently, the color filter 4 takes the configuration as shown in FIG. 3. As the light shielding area between the adjacent color layers can be omitted, the aperture ratio of the color filter 4 can be increased from the conventional ratio, resulting in the higher brightness of the image display. As shown in FIG. 3, the light shielding area 19 is disposed corresponding to the scan line 13 on the color filter 4. In general, the scan line 13 is formed with a conductive material having light shielding characteristics. Therefore, the scan line 13 does not transmit a light. The provision of the light shielding area 19 corresponding to the scan line 13 does not lower the brightness.

Further, as no light shielding area is disposed between the adjacent color layers, there is an advantage that a color shift due to the aging can be suppressed. As already explained, near the boundary between the green color layer and the light shielding area, the specific resistance of the green color layer is lowered, a charge is accumulated, and the light transmittance varies, resulting in a change in the color tone of the total image displayed. However, according to the first embodiment, no light shielding area is disposed between the adjacent color layers, and the color layers are directly in contact with each other. Therefore, it is possible to substantially reduce the area in which the color layer and the light shielding area are directly in contact with each other. Accordingly, unlike the conventional IPS liquid crystal cell, the accumulation of a carrier in a part of the area can be suppressed, and the color shift can be reduced substantially.

Figure 5:
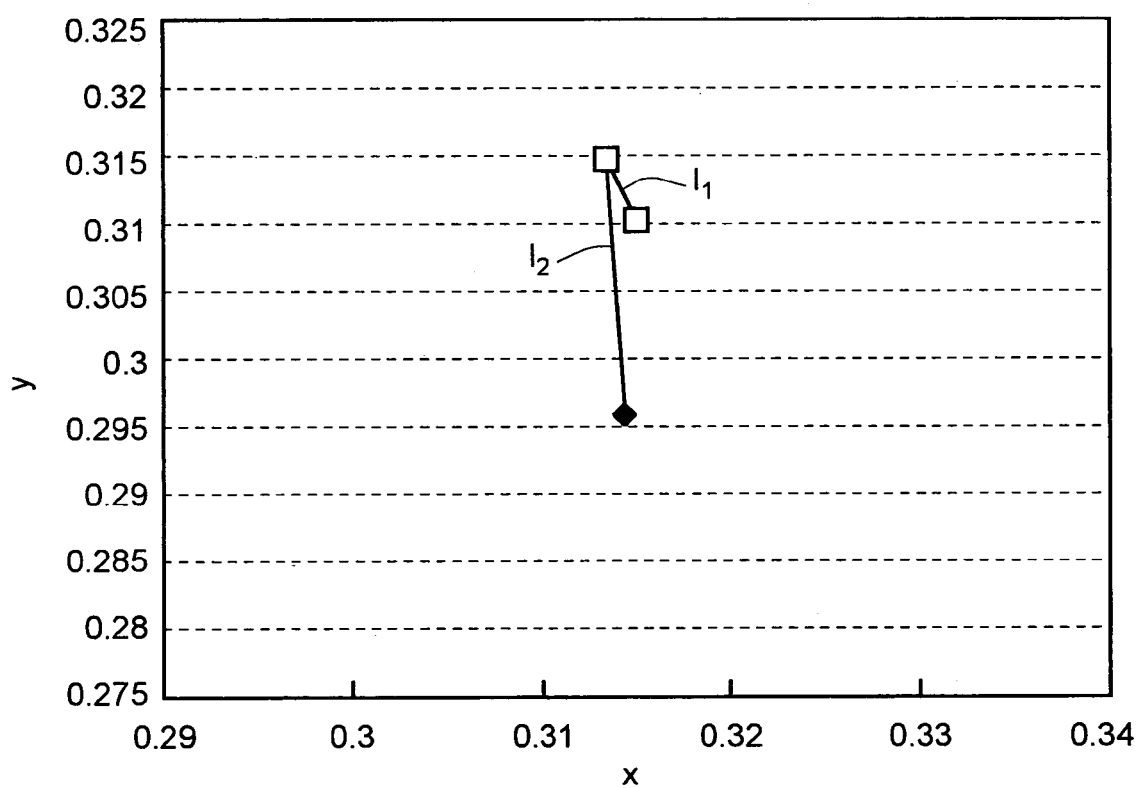
FIG. 5 is a graph illustrating a color shift as a result of carrying out an acceleration test in the liquid crystal display device and a liquid crystal display device of the conventional IPS configuration.

FIG. 5 is a graph illustrating a color shift in a displayed image, as a result of carrying out an acceleration test in the liquid crystal display device according to the first embodiment. In FIG. 5, a line $I_1$ represents a color shift in the liquid crystal display device according to the first embodiment, and a line $I_2$ represents a color shift in the liquid crystal display device according to the conventional IPS configuration. The graph of FIG. 5 is expressed in xy color tone coordinates, where the horizontal axis shows x values and the vertical axis represents y values.

It is clear that as a result of a comparison between the line $I_1$ and the line $I_2$, the liquid crystal display device according to the first embodiment can obtain a very satisfactory change value in the y value. Specifically, while the line 12 has a reduction of about 0.02 in the y value, the line $I_1$ has a reduction of only about 0.005 in the y value. In general, so long as the y value does not change 0.01 or above, a visual confirmation of the color shift is impossible. The liquid crystal display device according to the first embodiment can suppress the color shift to a level that can be visually confirmed. As explained above, the liquid crystal display device according to the first embodiment has the light shielding area 19 disposed on the color filter 4 in order to suppress the occurrence of a light leak current of the thin-film transistor 14. Therefore, a slight accumulation of a charge occurs near the boundary between the light shielding area 19 and the color layer, which results in a fine color shift. However, as the color shift can be suppressed to a level that cannot be visually confirmed, no practical problem arises.

The graph of FIG. 5 indicates that the liquid crystal display device according to the first embodiment has a slight aggravation in the change of the x value as compared with the liquid crystal display device of the conventional IPS configuration. However, the liquid crystal display device according to the first embodiment has a change in the x value by about 0.002, which is only about one tenth of the level that can be visually confirmed. Consequently, this change is not problematic to the image display.

As explained above, the adjacent color layers are directly in contact with each other, and no light shielding area is disposed between the adjacent color layers. With this arrangement, the liquid crystal display device according to the first embodiment can suppress the color shift due to aging to a level that cannot be visually confirmed. Therefore, the liquid crystal display device according to the first embodiment does not damage the quality of an image, and can display a high-quality image, even when the liquid crystal display device is used for a long time.

A modification of the liquid crystal display device according to the first embodiment will be explained below. The liquid crystal display device according to the modification has a configuration of having a smaller area of the light shielding area disposed on the color filter.

Figure 6:
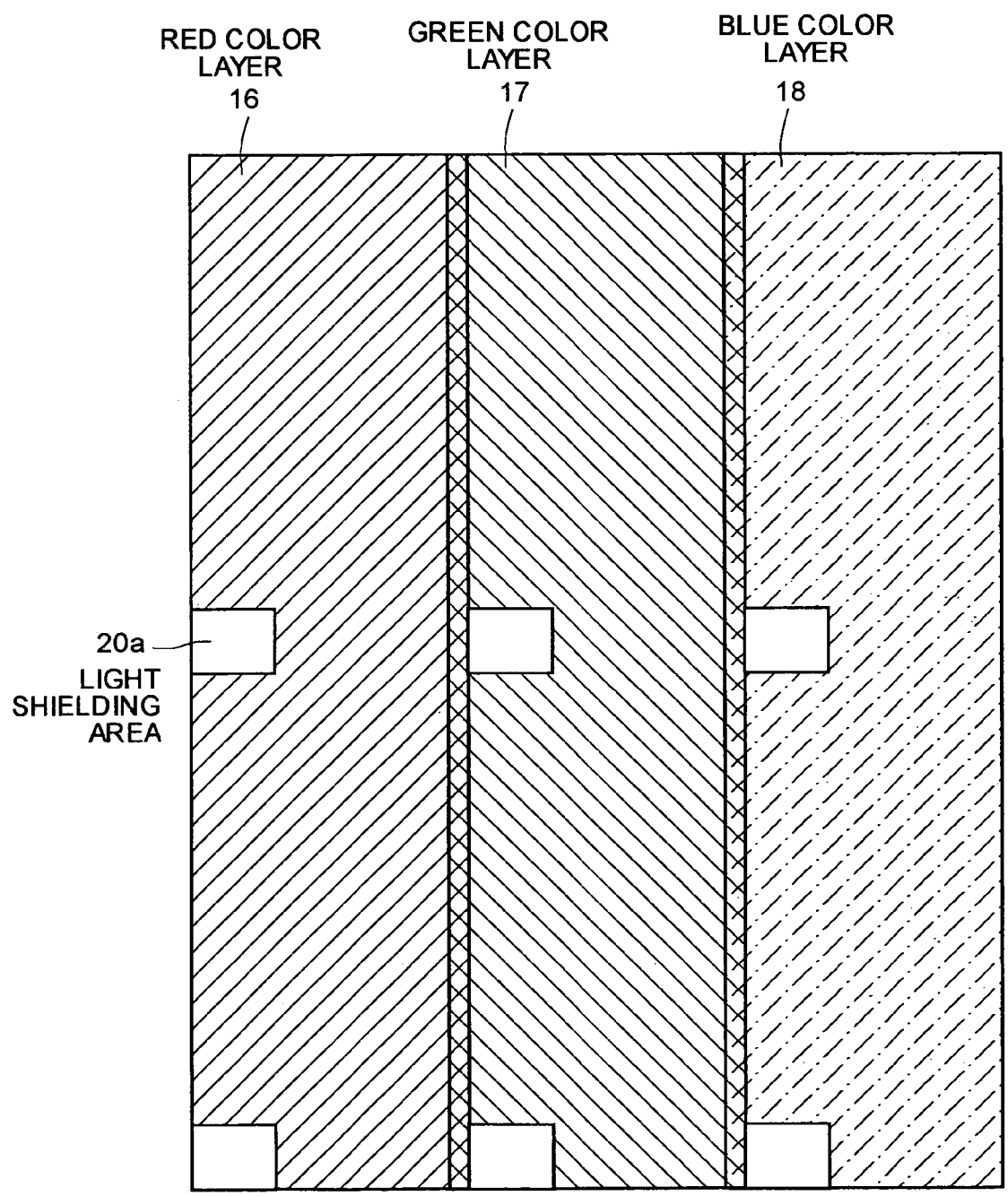
FIG. 6 is a top plan view of a color filter that constitutes a liquid crystal display device according to a modification of the first embodiment.

FIG. 6 is a schematic view of a configuration of the color filter that constitutes the liquid crystal display device according to the modification of the first embodiment. As shown in FIG. 6, the color filter according to the modification has a light shielding area 20 disposed corresponding to the thin-film transistor 14 that is disposed on the array substrate 1.

In the present invention, the light shielding area is provided to suppress the occurrence of a light leak current of the thin-film transistor 14. Therefore, the provision of the light shielding area in the area corresponding to the thin-film transistor 14 can achieve a necessary and sufficient function. When this configuration is employed, the area in which the color layer and the light shielding area 20 are in contact can be made smaller. Consequently, the color shift can be further suppressed.

Figure 7:
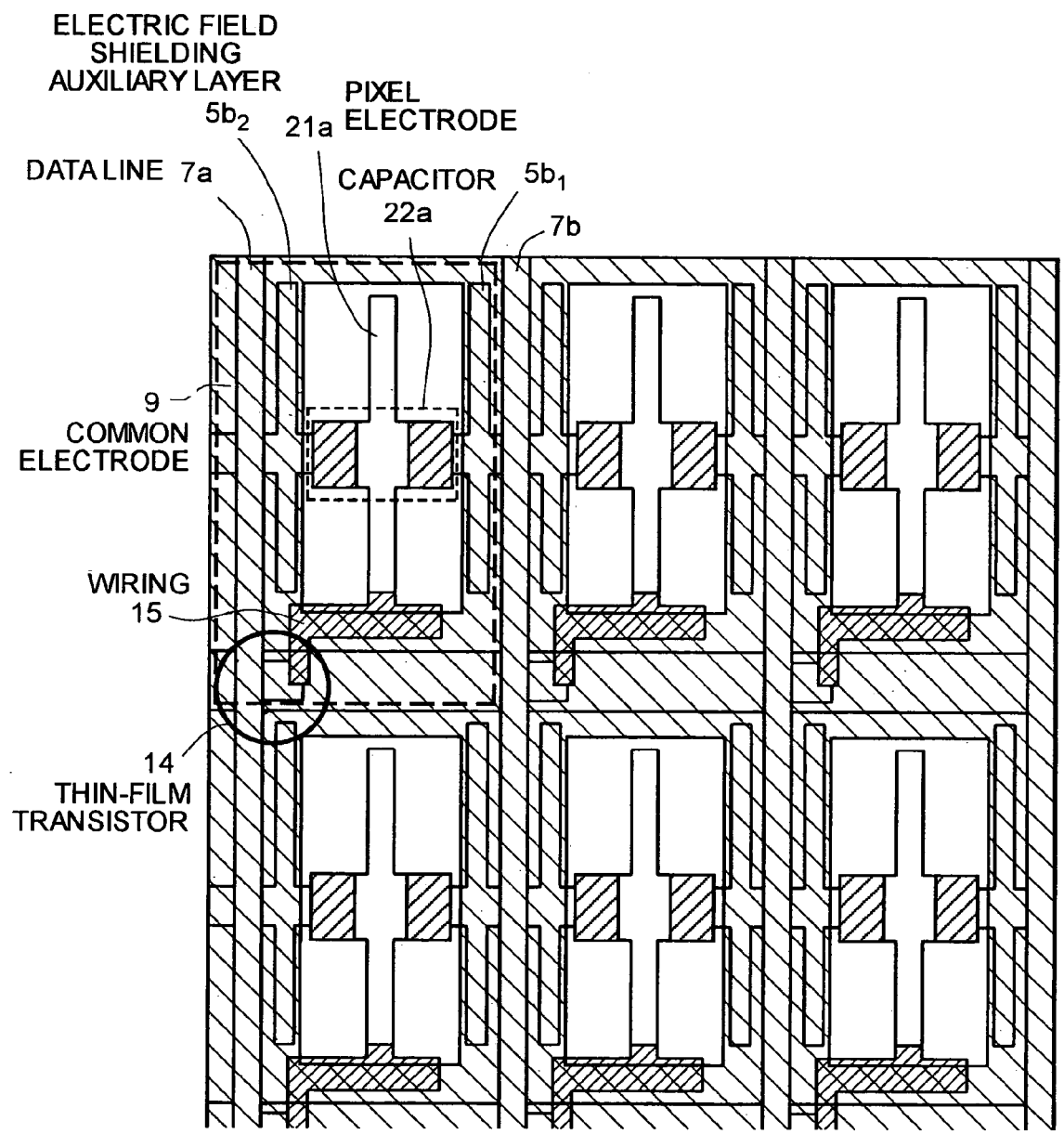
FIG. 7 is a top plan view of a circuit disposed on an array substrate that constitutes the liquid crystal display device according to a second embodiment of the present invention.
Figure 8A:
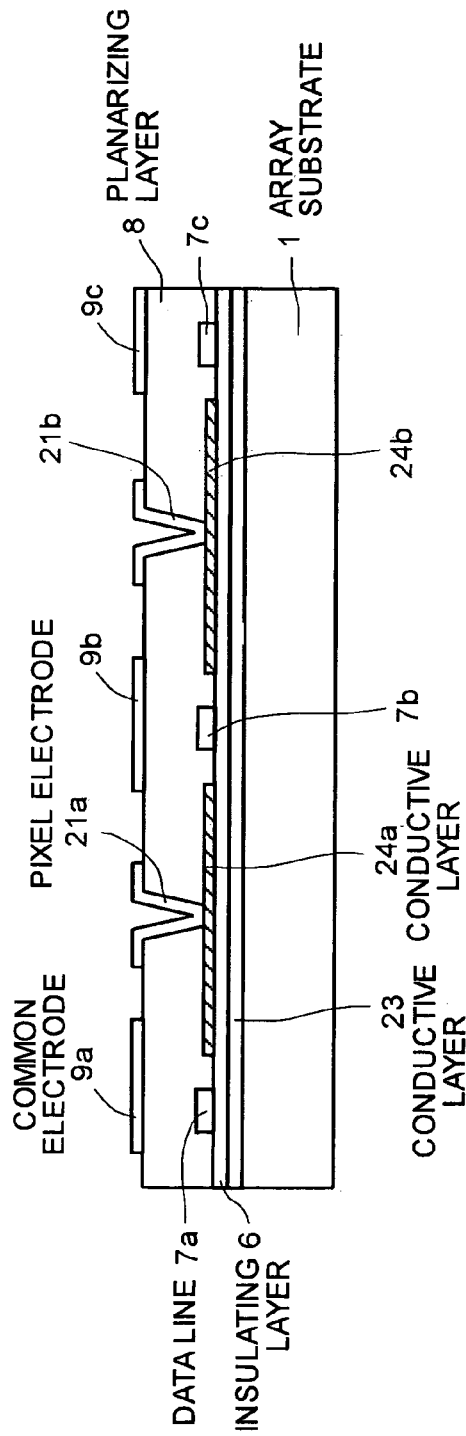
FIG. 8A is a cross-sectional view of the circuit cut along a line A—A in FIG. 7.
Figure 8B:
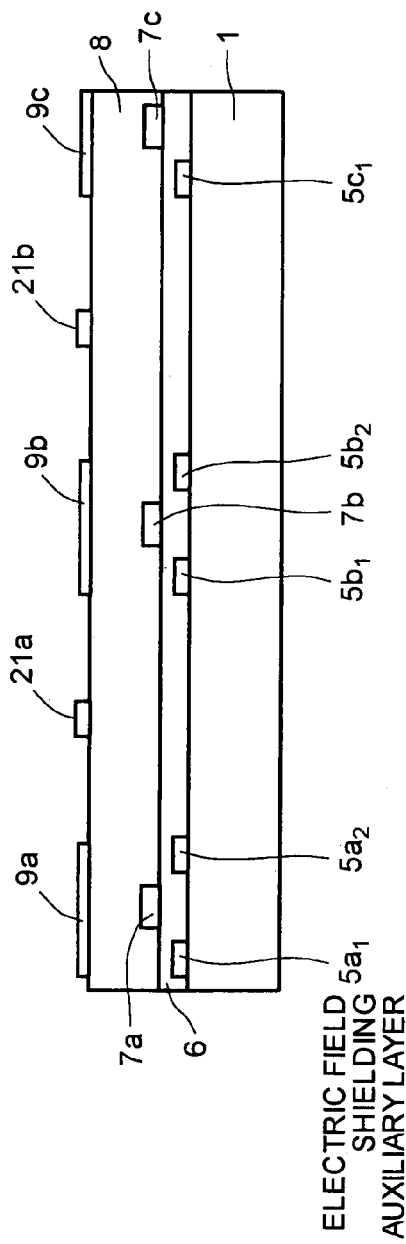
FIG. 8B is a cross-sectional view of the circuit cut along a line B—B in FIG. 7.

A liquid crystal display device according to a second embodiment of the present invention is explained next. The liquid crystal display device according to the second embodiment has an auxiliary capacitance to stabilize the potential of the pixel electrode on the array substrate. Another light shielding area is further provided on the color filter corresponding to the auxiliary capacitance. FIG. 7 is a top plan view of a wiring on the array substrate that constitutes the liquid crystal display device according to the second embodiment. FIG. 8A and FIG. 8B are cross-sectional views of the wiring shown in FIG. 7. FIG. 9 is a top plan view of a configuration of a color filter 25 that constitutes the liquid crystal display device according to the second embodiment. In the second embodiment, like parts having configurations similar to those in the first embodiment are designated with like reference numerals, and are assumed to have the same functions as those of the first embodiment unless specified otherwise.

A plane configuration of the circuit disposed on the array substrate is explained first. As shown in FIG. 7, a wiring is provided corresponding to a plurality of pixel electrodes on the array substrate. The wiring corresponding to a display screen shown in a area encircled by a broken line in FIG. 7 is explained, like in the first embodiment.

A pixel electrode 21a extending in a perpendicular direction is disposed on the array substrate from the center of a area corresponding to the display pixel. The common electrode 9a is disposed with a predetermined distance from the pixel electrode 21a. The pixel electrode 21a is connected to on source/drain electrode of the thin-film transistor 14 via the wiring 15. The other source/drain electrode of the thin-film transistor 14 is connected to the data line 7a that extends in the perpendicular direction. A gate electrode of the thin-film transistor 14 is connected to the scan line 13 that extends in the lateral direction. The thin-film transistor 14 gives a predetermined potential to the pixel electrode 21a, like in the first embodiment. An electric field is generated between the pixel electrode 21a that is given the predetermined potential and the common electrode 9a, and the orientation of the near liquid crystal molecule is changed to display an image, like in the first embodiment.

The liquid crystal display device according to the second embodiment has a capacitor 22a that extends in a lateral direction from the center of a area corresponding to the display pixel. The cross section of the area including the capacitor 22a is explained with reference to FIG. 8A.

The capacitor 22a comprises a conductive layer 23 and a conductive layer 24 disposed on the conductive layer 23 via the insulating layer 6 as shown in FIG. 8A. The conductive layer 24 and the pixel electrode 21a are electrically connected to each other. The conductive layer 23 is electrically connected to the common electrode 9a. The common electrode 9a is maintained with substantially a constant potential, and the conductive layer 23 is also maintained with substantially a constant potential.

As the capacitor 22a is additionally disposed, the liquid crystal display device according to the second embodiment has an advantage in that the potential of the pixel electrode is stabilized during the operation. Therefore, the orientation of the liquid crystal molecule that constitutes the liquid crystal layer 3 can be controlled accurately. Further, a higher-quality image can be displayed.

The conductive layer 23 that constitutes the capacitor 22a also extends along the data line 7 below the data line 7. Therefore, the conductive layer 23 also functions as an electric field shielding auxiliary layer. Particularly, as the conductive layer 23 extends along the total layer below the data line 7, the electric field attributable to the data line 7 can be shielded effectively.

The cross section of the area other than the area in which the capacitor 22a is disposed is explained with reference to FIG. 8B. The liquid crystal display device according to the second embodiment also has a structure of having the common electrode 9 disposed immediately above the data line 7 in a similar manner to that of the first embodiment. When the common electrode 9 shields the electric field attributable to the data line 7, it is possible to prevent the electric field from affecting the liquid crystal layer 3 in a similar manner to that of the first embodiment.

The configuration of the color filter 25 is explained next. As shown in FIG. 9, the color filter 25 has a red color layer 26, a green color layer 27, and a blue color layer 28 directly in contact with each other. These layers are superimposed with each other in a area near the boundary. The light shielding area 19 is disposed in a area corresponding to the scan line 13. A light shielding area 29 is also disposed in a area corresponding to the capacitor 22.

The conductive layer 23 and the conductive layer 24 that constitute the capacitor 22 are formed with light-shielding conductive materials respectively. Therefore, the provision of the light shielding area 29 does not lower the brightness of the displayed image. The provision of the light shielding area 29 slightly increases the area in which the color layer and the light shielding area are in contact with each other. However, this configuration can lower the color shift to a level that can be visually confirmed as compared with the conventional configuration having the light shielding area disposed between the adjacent color layers.

The color filter explained in the first embodiment can also be used in the liquid crystal display device according to the second embodiment. Specifically, the color filters shown in FIG. 3 and FIG. 6 can be used to constitute the liquid crystal display device. In this case, the color shift can be lowered to a level that can be visually confirmed.

In the liquid crystal display device according to the first or the second embodiment, the electric field shielding auxiliary layers $5a_1$ to $5c_1$ may be connected to the pixel electrodes instead of the common electrodes. As the electric field shielding auxiliary layers $5a_1$ to $5c_1$ take predetermined potentials, the electric field generated from the data line can be shielded. Therefore, the common electrodes do not need to be electrically connected.

Figure 10:
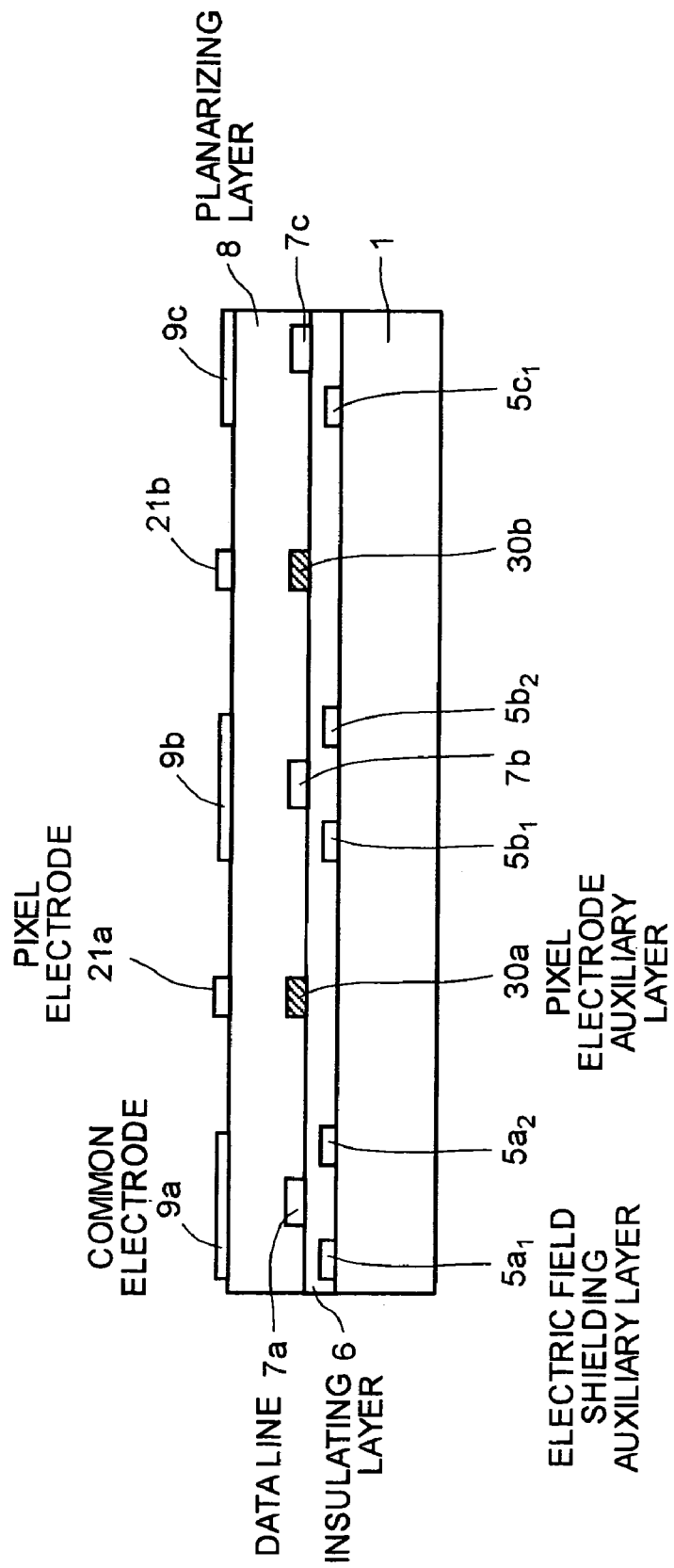
FIG. 10 is a cross-sectional view of an array substrate that constitutes the liquid crystal display device according to a modification of the first and second embodiments.

In the liquid crystal display device according to the first or the second embodiment, the electric field shielding auxiliary layers may be provided immediately below the pixel electrodes. FIG. 10 is a cross-sectional view of a configuration of an array substrate according to a modification of the first and the second embodiments. As shown in FIG. 10, in this modification, pixel electrode auxiliary layers 30a and 30b are disposed immediately below the pixel electrodes 21a and 21b. When predetermined potentials are given to the pixel electrodes 21a and 21b, leakage of the electric field from the data lines 7a to 7c to the liquid crystal layer 3 can be effectively suppressed. While the pixel electrode auxiliary layers 30a and 30b may have independent potentials, it is preferable that the pixel electrode auxiliary layers 30a and 30b are electrically connected to the pixel electrodes 21a and 21b respectively. This is for the following reasons. As the pixel electrode auxiliary layers 30a and 30b are located near the pixel electrodes 21a and 21b, these can be easily electrically connected to each other. Further, it is necessary to prevent the potentials of the pixel electrode auxiliary layers 30a and 30b from affecting the orientation of the liquid crystal molecule contained in the liquid crystal layer 3. Depending on a detailed configuration of the circuit on the array substrate, the pixel electrode auxiliary layers 30a and 30b may be electrically connected to common electrodes 9a to 9c respectively.

Figure 11:
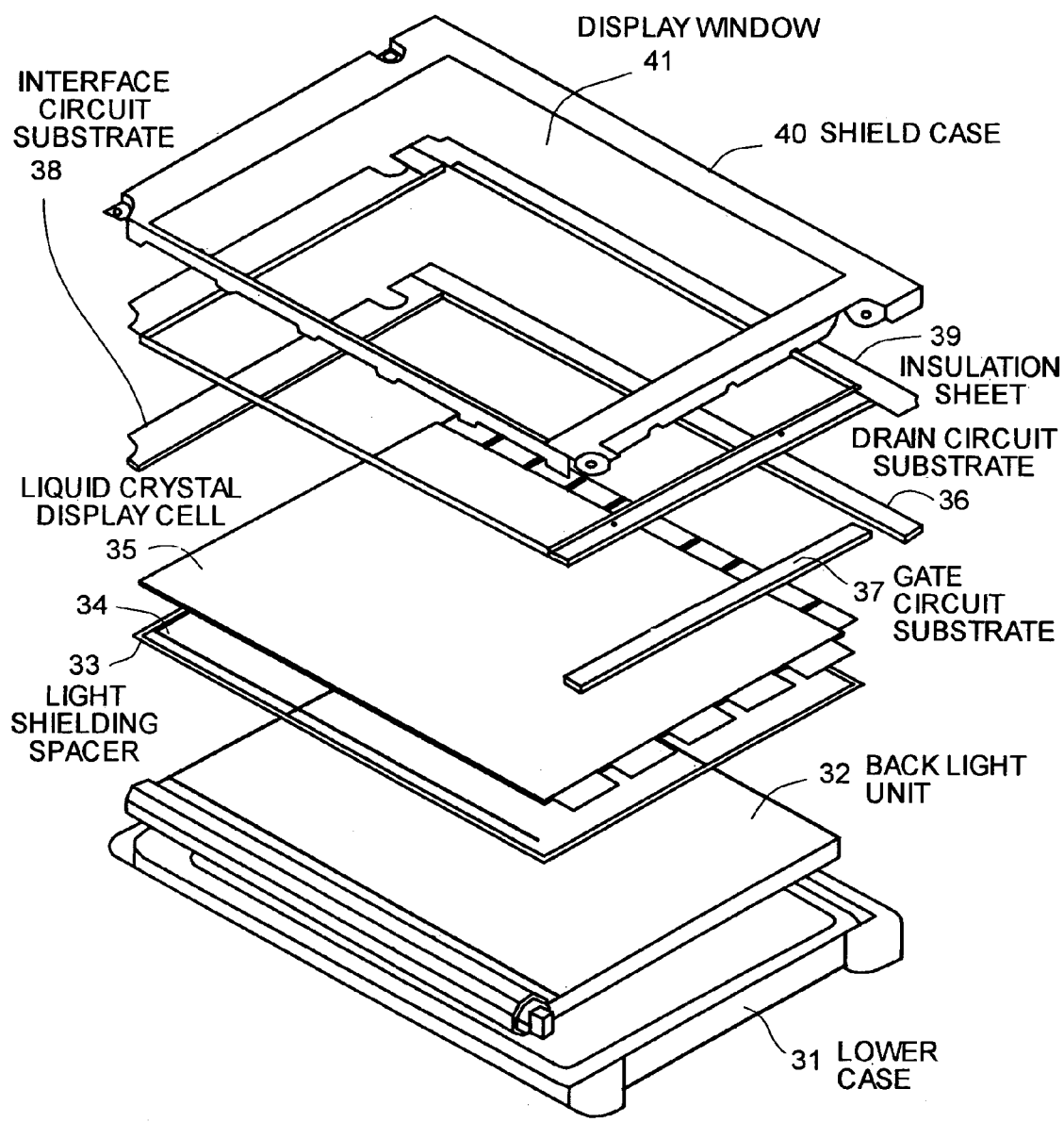
FIG. 11 is a perspective view of a liquid crystal display apparatus according to a third embodiment of the present invention.
Figure 12:
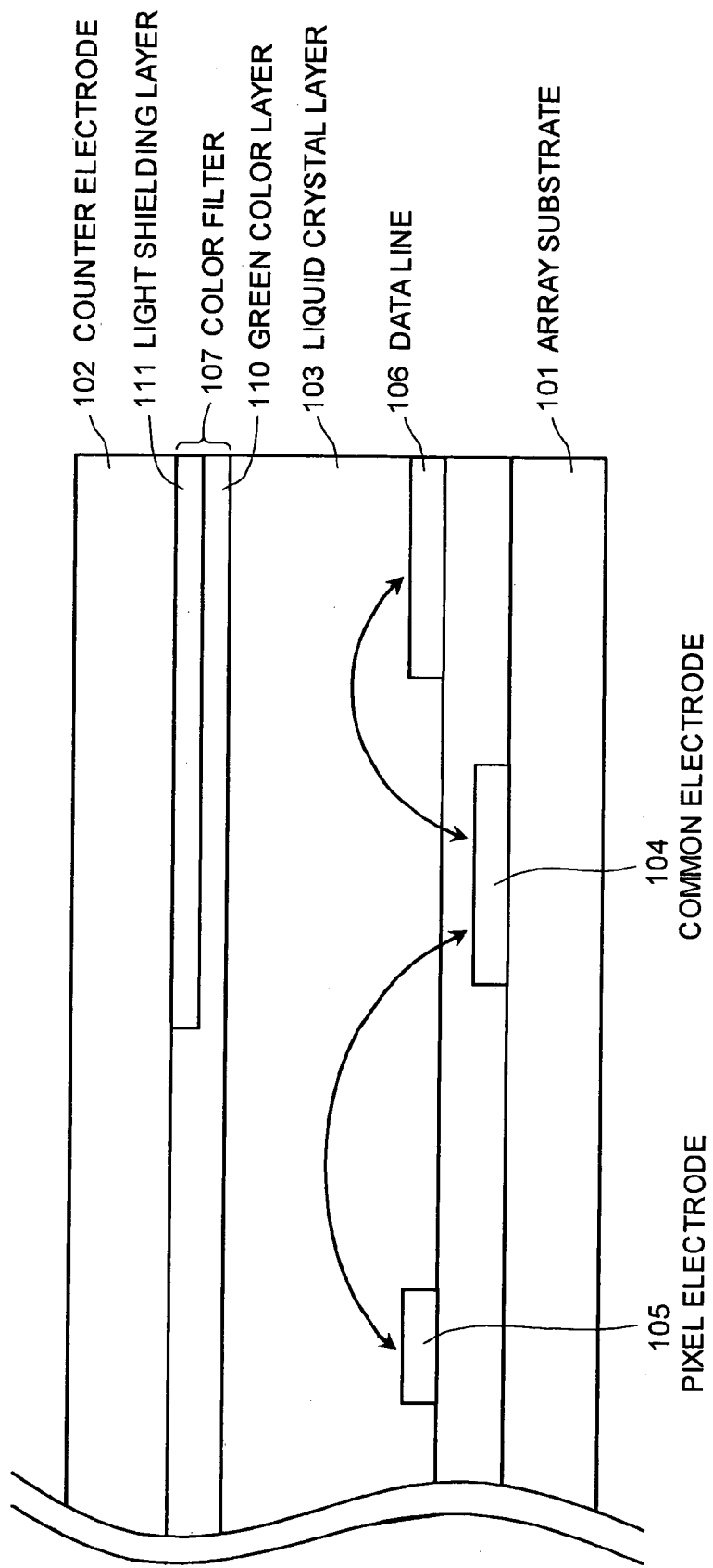
FIG. 12 is a schematic view of an electric field that is generated during the operation in an image display apparatus of the conventional IPS configuration.
Figure 13:
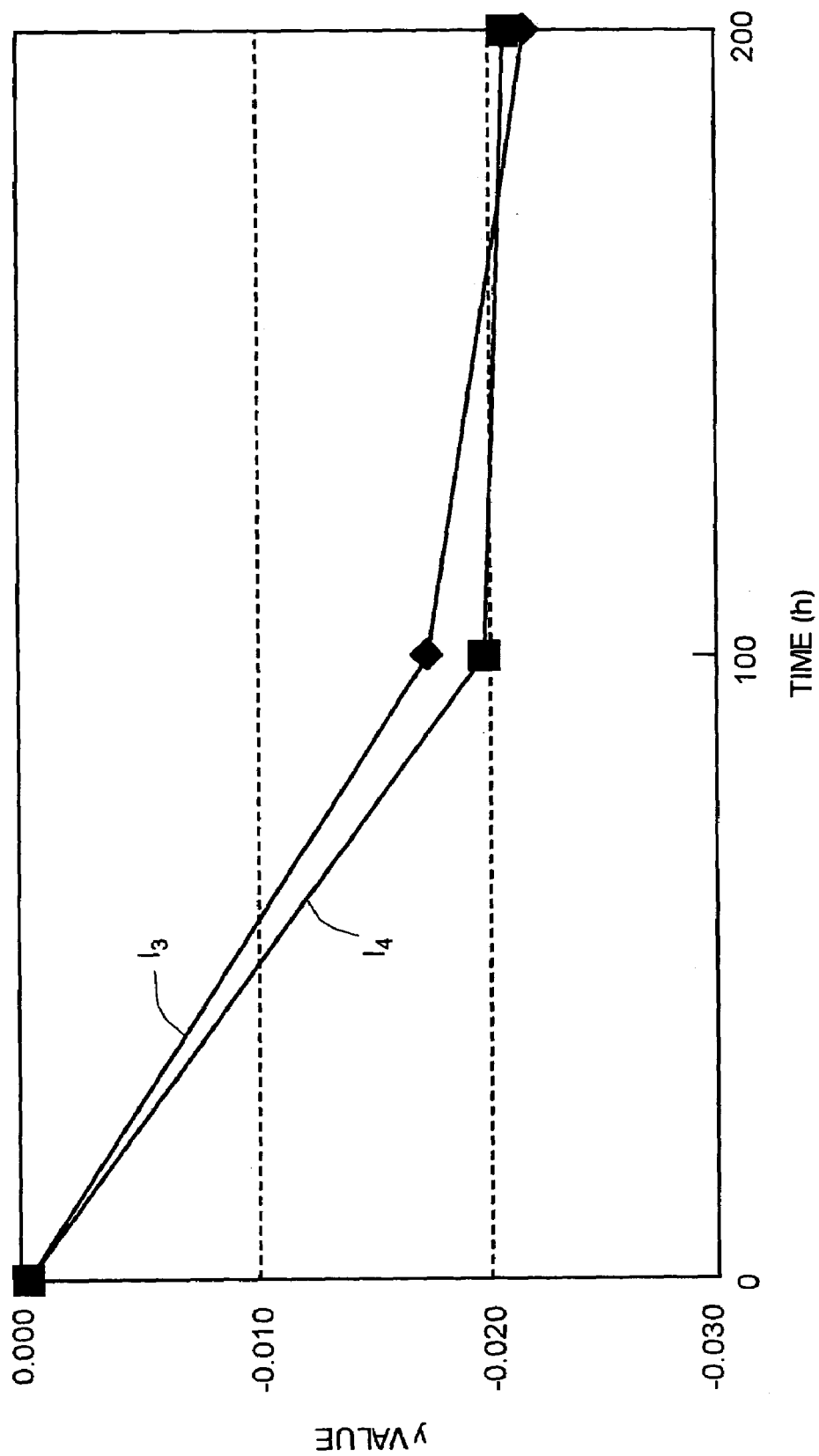
FIG. 13 is a graph illustrating a variation in the color tone of a display image in the image display apparatus of the conventional IPS configuration.

A liquid crystal display apparatus according to a third embodiment is explained next. The liquid crystal display apparatus according to the third embodiment has a configuration using the liquid crystal display device according to the first or the second embodiment. FIG. 11 is an exploded view of the liquid crystal display apparatus according to the third embodiment. In FIG. 11, the liquid crystal display apparatus is broken down into members in order to facilitate the understanding of the configuration of the liquid crystal display. It is needless to mention that these members are actually combined together to form the liquid crystal display according to the third embodiment.

The liquid crystal display apparatus includes a back light unit 32, a light shielding spacer 33, and a liquid crystal display device 35 sequentially disposed in this order on a lower case 31. A drain circuit substrate 36, a gate circuit substrate 37, and an interface circuit substrate 38 are formed on the light shielding spacer 33. These circuit substrates are electrically connected with the liquid crystal display device 35. A shield case 40 is disposed on the liquid crystal display device 35 via an insulation sheet 39. The shield case 40 has a display window 41 to define a liquid crystal display area near the center.

The back light unit 32 is used to irradiate a plane light that proceeds in a direction perpendicular to the liquid crystal display device 35. The back light unit 32 has the following configuration. A reflection plate that is provided on the bottom of the back light unit 32A reflects a light that is emitted from a fluorescent lamp as a light source. The reflected light is transmitted through an optical waveguide and a spread plate to form a plane beam, and this plane beam is incident to the liquid crystal display device 35.

The liquid crystal display device 35 explained in the first or the second embodiment is used for the liquid crystal display device 35 in the third embodiment. Therefore, the common electrode exhibits the function of shielding the electric field attributable to the data line, and this common electrode is disposed on the common electrode to form the color filter. On this color filter, the color layers are directly in contact with each other. Accordingly, the electric field attributable to the data line does not affect the liquid crystal layer. The accumulation of a charge in a part of the area of the color filter can be suppressed, thereby to suppress the color shift.

The drain circuit substrate 36 and the gate circuit substrate 37 are formed with electronic circuits respectively, thereby to apply predetermined voltages to the source/drain electrode and the gate electrode of the thin-film transistor disposed in the liquid crystal display device 35. The interface circuit substrate 38 is formed with a predetermined electronic circuit, thereby to control the drain circuit substrate 36 and the gate circuit substrate 37. These circuit substrates are used to select a predetermined pixel electrode and apply a voltage, thereby to change the light transmittance of each pixel and obtain a desired image.

While the first to the third embodiments according to the present invention are explained above, the present invention is not limited to the contents described above. A person skilled in the art could easily conceive various kinds of embodiments and modifications. For example, in the first embodiment, while the light shielding area 19 is disposed on the color filter 4, the light shielding area 19 is provided to suppress the occurrence of a light leak current in the thin-film transistor 14. Therefore, when the occurrence of a light leak current can be suppressed, the light shielding area 19 can be omitted. In this case, the color shift due to aging can be further reduced. Instead of the thin-film transistor, a metal insulator metal (MIM) driving unit may be used for the switching element.

In the first and the second embodiments, while the color filter is explained to be disposed on the counter substrate, the color filter may be disposed on the array substrate. When the color filter is disposed on the array substrate, there is an effect that the color shift can be reduced by not disposing the light shielding area between the adjacent color layers, like in the first and the second embodiments.

In the first and the second embodiments, while the common electrode is used as the electric field shielding layer in order to shield the electric field attributable to the data line 7, other wiring may be used to shield the electric field. However, the common electrode is essential for the liquid crystal display device irrespective of the object of shielding the electric field. When the common electrode has a function of an electric field shielding layer, this is preferable from the viewpoint of reducing the load on the manufacturing process.

The plane shapes of the pixel electrode and the common electrode that constitute the liquid crystal display device and the color layers disposed corresponding to these electrodes are not limited to those shown in the first or the second embodiments. For example, the following configuration is known as a modification of the IPS configuration. The plane shape of the liquid crystal display device is not linear, but is bent at least one part. The plane shape of a part of the common electrode opposite to the pixel electrode is also bent corresponding to the pixel electrode. With this configuration, it is known that the color change due to the view angle can be suppressed, and an image of high color purity and high contrast ratio can be displayed. Using this configuration, the liquid crystal display device and the liquid crystal display according to the present invention can be realized. A color filter of the configuration having the boundary of the color layer bent corresponding to the bend configuration can be used.

In the third embodiment, a reflection system having an external light such as sunlight as a light source can be employed in place of the back light unit. Alternatively, a translucent system may be employed.

As explained above, according to the present invention, the liquid crystal display device has the pixel electrode and the common electrode disposed on the same substrate. This liquid crystal display device can prevent the electric field generated from the data line from disturbing the orientation of the liquid crystal molecule that constitutes the liquid crystal layer. There is an effect that the color filter can omit a light shielding layer to improve the contrast of the display image. The first light transmission window and the second light transmission window that constitute the color filter are directly in contact with each other, and no light shielding layer is disposed between these windows. Therefore, there are effects such as the aperture ratio rises, and a chemical action between the light transmission layer and the light shielding layer suppresses the variation in the light transmittance of the light transmission window. Further, a variation in the color tone of the display image at the visual level can be prevented.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A liquid crystal display device comprising:
    a planarizing layer;
    a common electrode on the planarizing layer;
    a first pixel electrode on the planarizing layer, wherein an electric field is generated between the first pixel electrode and the common electrode;
    a second pixel electrode on the planarizing layer, wherein an electric field is generated between the second pixel electrode and the common electrode;
    a liquid crystal layer that covers the common electrode, the first pixel electrode, and the second pixel electrode;
    a first data line;
    an electric field shielding layer near the first data line, wherein the electric field shielding layer is covered by an insulating layer and shields the liquid crystal layer from an electric field generated from the first data line;
    a first switching element that applies to the first pixel electrode an electric potential according to display signals supplied to the first data line;
    a second data line;
    a second switching element that applies to the second pixel electrode an electric potential according to display signals supplied to the second data line;
    a scan line that is supplied with scan signals to control the first switching element and the second switching element; and
    a color filter layer that includes a first filter and a second filter in contact with the first filter, wherein the first filter transmits a light, of a first wavelength, that passes through the first pixel electrode, and the second filter transmits a light, of a second wavelength, that passes through the second pixel electrode.

2. The liquid crystal display device according to claim 1, wherein
    the common electrode is supplied with substantially a constant potential, and is disposed immediately above any one of the first data line and the second data line.

3. The liquid crystal display device according to claim 1, wherein
    the common electrode shields the liquid crystal layer from an electric field generated from any one of the first data line and the second data line.

4. The liquid crystal display device according to claim 1, wherein at least a part of the first filter overlaps on at least a part of the second filter overlap.

5. The liquid crystal display device according to claim 1, further comprising a light shielding area immediately above the scan line on the color filter layer.

6. The liquid crystal display device according to claim 1, further comprising a light shielding area immediately above each of the first switching element and the second switching element on the color filter layer.

7. The liquid crystal display device according to claim 1, wherein
    the electric field shielding layer is disposed in a layer below the first data line.

8. The liquid crystal display device according to claim 1, wherein
    the electric field shielding layer is electrically connected to the common electrode.

9. The liquid crystal display device according to claim 1, wherein
    the first electric field shielding layer is electrically connected to the first pixel electrode.

10. The liquid crystal display device according to claim 1, further comprising a pixel electrode auxiliary layer that is disposed immediately below the first pixel electrode on the same layer as the first data line.

11. The liquid crystal display device according to claim 1, further comprising:
    a capacitor that includes a first conductive layer which is electrically connected to the first pixel electrode, an insulating layer, and a second conductive layer which is disposed opposite to the first conductive layer via the insulating layer, wherein the second conductive layer is maintained with substantially a constant potential.

12. The liquid crystal display device according to claim 11, wherein the second conductive layer is electrically connected to the common electrode.

13. The liquid crystal display device according to claim 11, further comprising a light shielding area immediately above the capacitor on the color filter layer.

14. A liquid crystal display apparatus comprising:
    a liquid crystal display device that includes
        a planarizing layer;
        a common electrode on the planarizing layer
        a first pixel electrode on the planarizing layer, wherein the first pixel electrode generates an electric field with the common electrode;
        a second pixel electrode on the planarizing layer, wherein the second pixel electrode generates an electric field with the common electrode;
        a liquid crystal layer that covers the common electrode, the first pixel electrode, and the second pixel electrode;
        a first data line;
        an electric field shielding layer near the first data line, wherein the electric field shielding layer is covered by an insulating layer and shields the liquid crystal layer from an electric field generated from the first data line;
        a first switching element that applies to the first pixel electrode an electric potential according to display signals supplied to the first data line;
        a second data line;
        a second switching element that applies to the second pixel electrode an electric potential according to display signals supplied to the second data line;
        a scan line that is supplied with scan signals to control the first switching element and the second switching element; and
        a color filter layer that includes a first filter and a second filter in contact with the first filter, wherein the first filter transmits a light of a first wavelength passing the first pixel electrode, and the second filter transmits a light of a second wavelength passing the second pixel electrode;
    a voltage application unit that is electrically connected to the first data line, the second data line, and the scan line, and that applies predetermined voltages to the first pixel electrode and the second pixel electrode;
    a control unit that controls the voltage application unit based on image information; and
    a frame member that houses the liquid crystal display device, the voltage application unit, and the control unit, and that includes a display window which defines a display screen.

15. The liquid crystal display apparatus according to claim 14, further comprising a back light source that irradiates to the liquid crystal display device.

* * * * *